(12) United States Patent
Schuijers et al.

(10) Patent No.: US 11,871,117 B2
(45) Date of Patent: Jan. 9, 2024

(54) SYSTEM FOR PERFORMING AMBIENT LIGHT IMAGE CORRECTION

(71) Applicant: KONINKLIJKE PHILIPS N.V., Eindhoven (NL)

(72) Inventors: Erik Gosuinus Petrus Schuijers, Breda (NL); Jonathan Alambra Palero, Waalre (NL); Yannyk Parulian Julian Bourquin, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 17/782,277

(22) PCT Filed: Dec. 15, 2020

(86) PCT No.: PCT/EP2020/086198
§ 371 (c)(1),
(2) Date: Jun. 3, 2022

(87) PCT Pub. No.: WO2021/122582
PCT Pub. Date: Jun. 24, 2021

(65) Prior Publication Data
US 2023/0016923 A1   Jan. 19, 2023

(30) Foreign Application Priority Data

Dec. 20, 2019  (EP) ..................................... 19218759

(51) Int. Cl.
*H04N 23/72* (2023.01)
(52) U.S. Cl.
CPC .................................. *H04N 23/72* (2023.01)
(58) Field of Classification Search
None
See application file for complete search history.

(56) References Cited

U.S. PATENT DOCUMENTS 9,807,356 B1 * 10/2017 Minami ............... H04N 9/3194
10,009,554 B1 *  6/2018 Miao ......................... G06T 7/50
(Continued)

FOREIGN PATENT DOCUMENTS

WO         99/29102 A1     6/1999
WO       2011/009005 A2    1/2011
(Continued)

OTHER PUBLICATIONS

International Search Report and Written Opinion dated Mar. 15, 2021 for International Application No. PCT/EP2020/086198 Filed Dec. 15, 2020.
(Continued)

*Primary Examiner* — James M Hannett

(57) ABSTRACT

There is provided a system (100) comprising a light source (110), an imaging unit (120) configured to capture a plurality of images of an subject, wherein each of the plurality of images is captured at an exposure time shorter than the wave period of the pulsed illumination, wherein the pulse frequency of the illumination is not a multiple integral of the frame rate at which the images are captured, and wherein a total time during which the plurality of images is captured is at least half of the wave period of the pulsed illumination, and a control unit (130) configured to: obtain a predetermined number n of candidate images, generate a sorted list of pixels by sorting respective pixels, apply a set of weights to the respective sorted list of pixels, and generate an estimated ambient light corrected image based on the plurality of weighted and sorted lists of pixels.

20 Claims, 7 Drawing Sheets

(56) References Cited

U.S. PATENT DOCUMENTS

| | | |
|---|---|---|
| 2011/0058023 A1 | 3/2011 | Boles |
| 2011/0242334 A1 | 10/2011 | Wilburn |
| 2012/0134548 A1 | 5/2012 | Rhoads |
| 2012/0154630 A1 | 6/2012 | Pinto |
| 2015/0229898 A1 | 8/2015 | Rivard |
| 2018/0232899 A1 | 8/2018 | Lansel |
| 2019/0166355 A1 | 5/2019 | Banks |

FOREIGN PATENT DOCUMENTS

| | | |
|---|---|---|
| WO | 2012/175703 A1 | 12/2012 |
| WO | 2018/145030 A1 | 8/2018 |
| WO | 2019/102444 A1 | 5/2019 |
| WO | 2021089422 A1 | 5/2021 |

OTHER PUBLICATIONS

International Preliminary Report on Patentability dated Jul. 6, 2021 for International Application No. PCT/EP2020/086198 Filed Dec. 15, 2020.

Johnson, et al: "Parameter Estimation by Least-Squares Methods", 1992, Academic Press, Inc.

* cited by examiner

SYSTEM FOR PERFORMING AMBIENT LIGHT IMAGE CORRECTION

CROSS REFERENCE TO RELATED APPLICATIONS

This application is the U.S. National Phase application under 35 U.S.C. §371 of International Application No. PCT/EP2020/086198 filed Dec. 15, 2020, which claims the benefit of European Patent Application Number 19218759.9 filed Dec. 20, 2019. These applications are hereby incorporated by reference herein.

FIELD OF THE INVENTION

The present disclosure relates to an apparatus and method for optical imaging, in particular to non-contact skin imaging systems and methods for performing ambient light image correction.

BACKGROUND OF THE INVENTION

There has been an increasing demand for non-obtrusive measurement and monitoring devices in the field of personal care and health application, particularly in skin sensing. Currently available skin measurement systems provide skin quantification and skin feature monitoring functions that offer consumers information that may be too small to detect, too faint to notice, or too slow to follow. In order for these types of systems to be deemed usable by normal consumers, the embedded sensing functions should be sensitive as well as specific. In addition, the robustness of the relevant measurements is also essential in order to build consumer trust.

SUMMARY OF THE INVENTION

A critical issue in such imaging measurement systems is that when they are used in an uncontrolled environment, e.g. at home, there are typically inconsistencies in measurement due to undefined and potentially varying ambient lighting. There are ambient light removal techniques that are currently available, such as active illumination methods that involve controlled illumination to probe and infer scene properties maybe used. Also, some currently available techniques include controlled capture setups, e.g. a light stage, for capturing images of a person or a scene in all lighting directions (multiplexed illumination), and re-render photorealistic images under arbitrary illumination. Some other techniques rely on projector-camera systems for projecting structured patterns for subsequent image analysis. While active techniques can enable high-quality illumination analysis and editing, these systems are typically complex and expensive. On the other hand, flash photography techniques offer ambient light removal by capturing two images of a scene, with and without flash illumination. These techniques have been used for image de-noising, de-blurring, artifact removal, non-photorealistic rendering, foreground segmentation, and matting.

It is observed that pulsing or flickering illumination at frequencies higher than the camera frame rate produces images with dark-bright horizontal bands in case of a rolling shutter as shown in FIG. 1. In FIG. 1, dark bands in the image are labelled as D and bright bands in the image are labelled as B. Furthermore, FIG. 2 illustrates the generation of bright and dark bands by pulsing light at a rolling shutter camera. For a rolling shutter camera, the exposure time $t_{exposure}$ is typically longer than the progression of a single horizontal line $t_{line}$ ($t_{exposure} > tl_{ine} = 1/(N*f_{framerate})$, where N is the number of horizontal lines). Therefore, under typical operating conditions lighting pattern shown in FIG. 1 emerge. In subsequent images the phase of these patterns varies.

In order to generate an image that is corrected for ambient light, one of the proposed techniques involve determining the minimum pixel value (corresponding to the low phase of the pattern, i.e. where only ambient light is present) and the maximum pixel value (corresponding the high phase of the pattern, i.e. where both ambient light and artificial light are present) per pixel for a sequence of images (e.g. 10 frames) and calculate the difference between the minimum and maximum values. However, as the signals originating from imaging sensors are typically noisy, especially at low light conditions, such technique may lead to unwanted pickup of noise—under ideal conditions the technique of calculating the difference between maximum and minimum values actually uses values where the noise is the largest as those are by definition the outliers to the sequence of observations. It would therefore be advantageous to provide an improved system and method for estimating an ambient light corrected image based on the same input image data.

To better address one or more of the concerns mentioned earlier, in a first aspect, a system for performing ambient light image correction is provided. The system comprises: a light source configured to provide pulsed illumination to an subject; an imaging unit configured to capture, while the subject is illuminated by the pulsed illumination from the light source, a plurality of images of the subject, wherein each of the plurality of images is captured at an exposure time shorter than the wave period of the pulsed illumination, wherein the pulse frequency of the illumination provided by the light source is not a multiple integral of the frame rate at which the plurality of images are captured by the imaging unit, and wherein a total time during which the plurality of images is captured is at least half of the wave period of the pulsed illumination; and a control unit configured to: obtain a predetermined number n of captured images, the candidate images, wherein the candidate images are n sequential captured images; generate, for each of every pixel location in the plurality of candidate images, a sorted list of pixels by sorting respective pixels each corresponding to the respective pixel location in the plurality of candidate images, wherein the sorting is based on the pixel value of the respective pixels; apply, for each of every pixel location in the plurality of candidate images, a set of weights to the respective sorted list of pixels, wherein the set of weights is associated with a least squares approximation of a probability density function of the pixel value over time; and generate an estimated ambient light corrected image based on the plurality of weighted and sorted lists of pixels by summing the plurality of weighted and sorted lists of pixels.

In some embodiments, n may be predetermined at least based on the pulse frequency of the pulse illumination and the frame rate at which the plurality of images are captured.

In some embodiments, the respective pixels each corresponding to the respective pixel location in the plurality of candidate images may be sorted by ascending order.

In some embodiments, the control unit may be configured to determine the set of weights to be applied to the sorted lists of pixels based on a signal-to-noise ratio of the plurality of candidate images.

In some embodiments, the control unit may be configured to determine the set of weights to be applied to the sorted lists of pixels based on at least one of: an exposure time at which the plurality of images are captured, a sensitivity level of the imaging unit, and a detected light level of the plurality of captured images.

In some embodiments, determining the set of weights to be applied to the sorted lists of pixels may comprise selecting, from a plurality of predetermined sets of weights, the set of weights to be applied.

In some embodiments, the set of weights to be applied to the sorted lists of pixels may be selected from a table of predetermined coefficients.

In some embodiments, the imaging unit may be configured to employ a rolling shutter such that each of the plurality of captured images comprises a plurality of bright bands and dark bands, wherein a bright band corresponds to a high state of the pulsed illumination and a dark band corresponds to a low state of the pulsed illumination.

In a second aspect, there is provided a method for performing ambient light image correction. The method comprises: providing pulsed illumination to a subject; capturing, while the subject is illuminated by the pulsed illumination, a plurality of images of the of the subject, wherein each of the plurality of images is captured at an exposure time shorter than the wave period of the pulsed illumination, wherein the pulse frequency of the illumination provided is not a multiple integral of the frame rate at which the plurality of images are captured, and wherein a total time during which the plurality of images is captured is at least half of the wave period of the pulsed illumination; obtaining a predetermined number n of captured images, the candidate images, wherein the candidate images are n sequential captured images; generating, for each of every pixel location in the plurality of candidate images, a sorted list of pixels by sorting the respective pixels each corresponding to the respective pixel location in the plurality of candidate images, wherein the sorting is based on the pixel value of the respective pixels; applying, for each of every pixel location in the plurality of candidate images, a set of weights to the respective sorted list of pixels, wherein the set of weights is associated with a least squares approximation of a probability density function of the pixel value over time; and generating an estimated ambient light corrected image based on the plurality of weighted and sorted lists of pixels by summing the plurality of weighted and sorted lists of pixels.

In some embodiments, n may be predetermined at least based on the pulse frequency of the pulse illumination and the frame rate at which the plurality of images are captured.

In some embodiments, sorting the respective pixels each corresponding to the respective pixel location in the plurality of candidate images may be by ascending order.

In some embodiments, the method may further comprise determining the set of weights to be applied to the sorted lists of pixels based on a signal-to-noise ratio of the plurality of candidate images.

In some embodiments, the method may further comprise determining the set of weights to be applied to the sorted lists of pixels based on at least one of: an exposure time at which the plurality of images are captured, a sensitivity level of the imaging unit, and a detected light level of the plurality of captured images.

In some embodiments, determining the set of weights to be applied to the sorted lists of pixels may comprise selecting, from a plurality of predetermined sets of weights, the set of weights to be applied.

In a third aspect, there is provided a computer program product comprising a computer readable medium, the computer readable medium having computer readable code embodied therein, the computer readable code being configured such that, on execution by a suitable computer or processor, the computer or processor is caused to perform the method as described herein.

According to the aspects and embodiments described above, the limitations of existing techniques are addressed. In particular, the above-described aspects and embodiments enable accurate estimation of ambient light corrected images at video rate in particular for low-cost imaging units that often have significant jitter on their timing. The embodiments described above offer a stateless technique for ambient light image correction which does not require determining the phase of the pattern caused by pulsed illumination. There is thus provided an improved system and method for ambient light image correction. These and other aspects of the disclosure will be apparent from and elucidated with reference to the embodiment(s) described hereinafter.

BRIEF DESCRIPTION OF THE DRAWINGS

For a better understanding of the embodiments, and to show more clearly how they may be carried into effect, reference will now be made, by way of example only, to the accompanying drawings, in which.

DETAILED DESCRIPTION OF THE EMBODIMENTS

As noted above, there is provided an improved system and method which address the existing problems.

Figure 3:
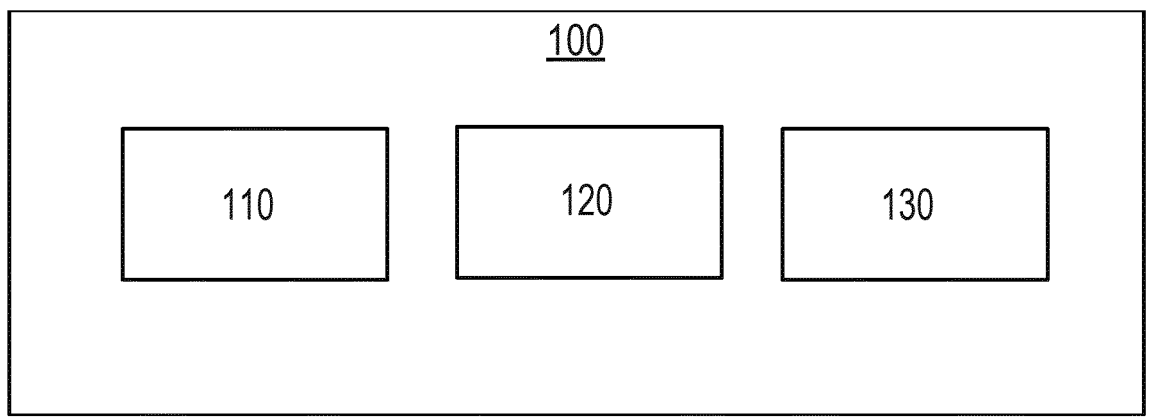
FIG. 3 is a block diagram of a system for ambient light image correction according to an embodiment.

FIG. 3 shows a block diagram of system 100 according to an embodiment, which can be used for performing ambient light image correction. The system 100 comprises a light source 110, an imaging unit 120, and a control unit 130.

The light source 110 is configured to provide pulsed illumination to a subject. In the context of the present disclosure, "pulsed illumination" refers to illumination provided at high-states and low-states at a sufficiently high frequency (i.e. herein referred to as a pulse frequency). In some embodiments, the light source 110 may be configured to provide the illumination with a pulse frequency of at least 70 Hz.

The imaging unit 120 is configured to capture, while the subject is illuminated by the pulsed illumination from the light source 110, a plurality of images of the subject. It will be appreciated that, in the context of the present disclosure, since the illumination is a pulsed illumination (with high-states and low-states), it is possible that at least one or more of the plurality of captured images may be captured during a low-state, i.e. at an instance during which the subject is not (fully) illuminated.

Each of the plurality of images is captured at an exposure time shorter than the wave period of the pulsed illumination. The pulsed frequency of the illumination provided by the light source 110 is not a multiple integral of the frame rate at which the plurality of images are captured by the imaging unit 120. A total time during which the plurality of images is captured is at least half of the wave period of the pulsed illumination. It will be appreciated that although the theoretical minimum for the total time during which the plurality of images is captured is half a wave period, in practice this may be actually, for example, ten wave periods—this is because it is typically more difficult to have a higher frame rate of the imaging unit 120 than the light source 110. In some embodiments, the upper limit for the total time during which the plurality of images is captured may be determined by any expected motion of the imaging unit 120 and/or the subject.

In some embodiments, capturing of the plurality of images of the subject may be triggered by a user, for example via a user interface at the system 100.

In some practical implementations, in order to obtain a sufficient number of data points that represent the distribution of pixel values so as to estimate the difference between light on and light off conditions, the plurality of images captured by the imaging unit 120 may be in the order of at least 8-10 frames. For example, if the frame rate of the imaging unit is 100 Hz and the number of captured images is 10, the total time during which the plurality of images is captured is 0.1 s. Also, as it is preferable to avoid flickering of light being perceived by a user, the pulse frequency may be at a very high rate, e.g. 117 Hz. With the configuration proposed in this example, the total time during which the images are captured would cover a large number of wave periods. By ensuring that the pulse frequency of the illumination is not a multiple integral of the frame rate, light pulse(s) can effectively be sampled at different phases of the pulsating light, which ensures that there is sufficient data resembling the distribution.

In some embodiments, the imaging unit 120 may be configured to employ a rolling shutter such that each of the plurality of captured images comprises a plurality of bright bands and dark bands. A bright band corresponds to a high state of the pulsed illumination, and a dark band corresponds to a low state of the pulsed illumination.

Alternatively, in some embodiments the imaging unit 120 may be configured to employ a global shutter. In these embodiments, the global shutter may be configured such that it is quick enough to accommodate requirements for the imaging unit 120 (e.g. with respect to frame rate and exposure time), while maintaining sufficient signal-to-noise ratio (SNR).

The control unit 130 is configured to obtain a predetermined number n (e.g. 10) of candidate images from the plurality of images captured by the imaging unit 120. The candidate images are n sequential images in the plurality of captured images. In some embodiments, n may be predetermined at least based on the pulse frequency of the pulse illumination and the frame rate at which the plurality of images are captured. In some embodiments, n may be further predetermined based on at least one of: lighting conditions and detected movement of the imaging unit and/or the subject.

In more detail, the control unit 130 may be configured to obtain the candidate images by selecting a subset of the images captured by the imaging unit 120. In some embodiments, in order to reduce motion artefacts, the predetermined number n of candidate images obtained may be minimized. Also, in some embodiments, the imaging unit 120 may be configured so as to only capture the predetermined number n of candidate images. In this case, the candidate images may be the same as the captured images.

As mentioned above, in some embodiments the imaging unit 120 may be configured to employ a global shutter. In these embodiments, the control unit 130 may be configured to obtain the candidate images by selecting images that correspond to the same phase of the pulsed illumination. By selecting images that correspond to the same phase of the pulsed illumination, the sorting operation (as described in more detail below) can be improved.

The control unit 130 is further configured to generate, for each of every pixel location in the plurality of candidate images, a sorted list of pixels by sorting respective pixels each corresponding to the respective location in the plurality of candidate images. The sorting is based on the pixel value of the respective pixels. For example, in the case the imaging unit 120 is a monochrome camera, the pixel value is the pixel value captured by the imaging unit 120 as is. As another example, in the case the imaging unit 120 is a RGB camera, the pixel value may be an intensity value obtained through the processing of the R value, the G value and the B value of the respective pixel in the candidate image, e.g. using "Lab" color space and taking the L values. The sorting of respective pixels each corresponding to the respective location in the plurality of candidate images may be based on intensity. Alternatively, in some embodiments the R, G and B values may be processed independently. In some embodiments, the respective pixels each corresponding to the respective pixel location in the plurality of candidate images may be sorted by ascending order.

The control unit 130 is configured to apply, for each of every pixel location in the plurality of candidate images, a set of weights to the respective sorted list of pixels, and to generate an estimated ambient light corrected image based on the plurality of weighted and sorted lists of pixels by summing the plurality of weighted and sorted lists of pixels. The set of weights is associated with a least squares approximation of a probability density function of the pixel value over time, as will be explained in more detail with reference to FIGS. 5A and 5B below.

In some embodiments, the control unit 130 may be configured to determine the set of weights to be applied to the sorted lists of pixels based on an estimated signal-to-noise ratio (SNR) of the plurality of candidate images. In some embodiments, the control unit 130 may be configured to determine the set of weights to be applied to the sorted lists of pixels based on at least one of: an exposure time at which the plurality of images are captured, a sensitivity level (ISO sensitivity) of the imaging unit, and a detected light level of the plurality of captured images. Determining the set of weights to be applied to the sorted lists of pixels may comprise selecting, from a plurality of predetermined sets of weights, the set of weights to be applied. In some embodiments, the set of weights to be applied to the sorted lists of pixels may be selected from a table of predetermined coefficients.

In general, the control unit 130 can control the operation of the system 100 and can implement the method described herein. The control unit 130 can comprise one or more processors, processing units, multi-core processor or modules that are configured or programmed to control the system 100 in the manner described herein. In particular implementations, the control unit 130 can comprise a plurality of software and/or hardware modules that are each configured to perform, or are for performing, individual or multiple steps of the method described herein.

In some embodiments, the system 100 may further comprise at least one user interface. Alternative or in addition, at least one user interface may be external to (i.e. separate to or remote from) the system 100. For example, at least one user interface may be part of another device. A user interface may be for use in providing a user of the system 100 with information resulting from the method described herein. Alternatively or in addition, a user interface may be configured to receive a user input. For example, a user interface may allow a user of the system 100 to manually enter instructions, data, or information. In these embodiments, the control unit 130 may be configured to acquire the user input from one or more user interface.

A user interface may be any user interface that enables the rendering (or output or display) of information to a user of the system 100. Alternatively or in addition, a user interface may be any user interface that enables a user of the system 100 to provide a user input, interact with and/or control the system 100. For example, the user interface may comprise one or more switches, one or more buttons, a keypad, a keyboard, a touch screen or an application (for example, on a tablet or smartphone), a display screen, a graphical user interface (GUI) or other visual rendering component, one or more speakers, one or more microphones or any other audio component, one or more lights, a component for providing tactile feedback (e.g. a vibration function), or any other user interface, or combination of user interfaces.

In some embodiments, the system 100 may comprise a memory. Alternatively or in addition, one or more memories may be external to (i.e. separate to or remote from) the system 100. For example, one or more memories may be part of another device. A memory can be configured to store program code that can be executed by the control unit 130 to perform the method described herein. A memory can be used to store information, data, signals and measurements acquired or made by the control unit 130 of the system 100. For example, a memory may be used to store the plurality of captured images, the plurality of candidate images, and/or the estimated ambient light corrected image. The control unit 130 may be configured to control a memory to store the plurality of captured images, the plurality of candidate images, and/or the estimated ambient light corrected image.

In some embodiments, the system 100 may comprise a communications interface (or circuitry) for enabling the system 100 to communicate with any interfaces, memories and/or devices that are internal or external to the system 100. The communications interface may communicate with any interfaces, memories and/or devices wirelessly or via a wired connection. For example, the communications interface may communicate with one or more user interfaces wirelessly or via a wired connection. Similarly, the communications interface may communicate with the one or more memories wirelessly or via a wired connection.

Figure 1:
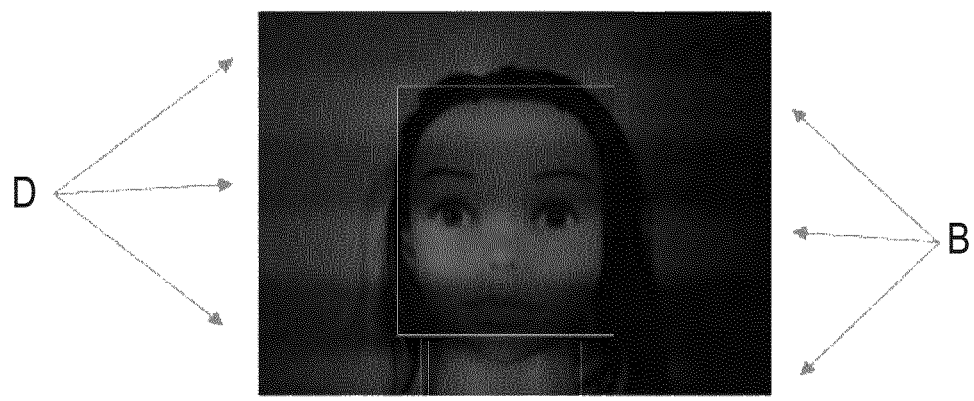
FIG. 1 shows an example of an image of a subject while the subject is illuminated by pulsed illumination.
Figure 2:
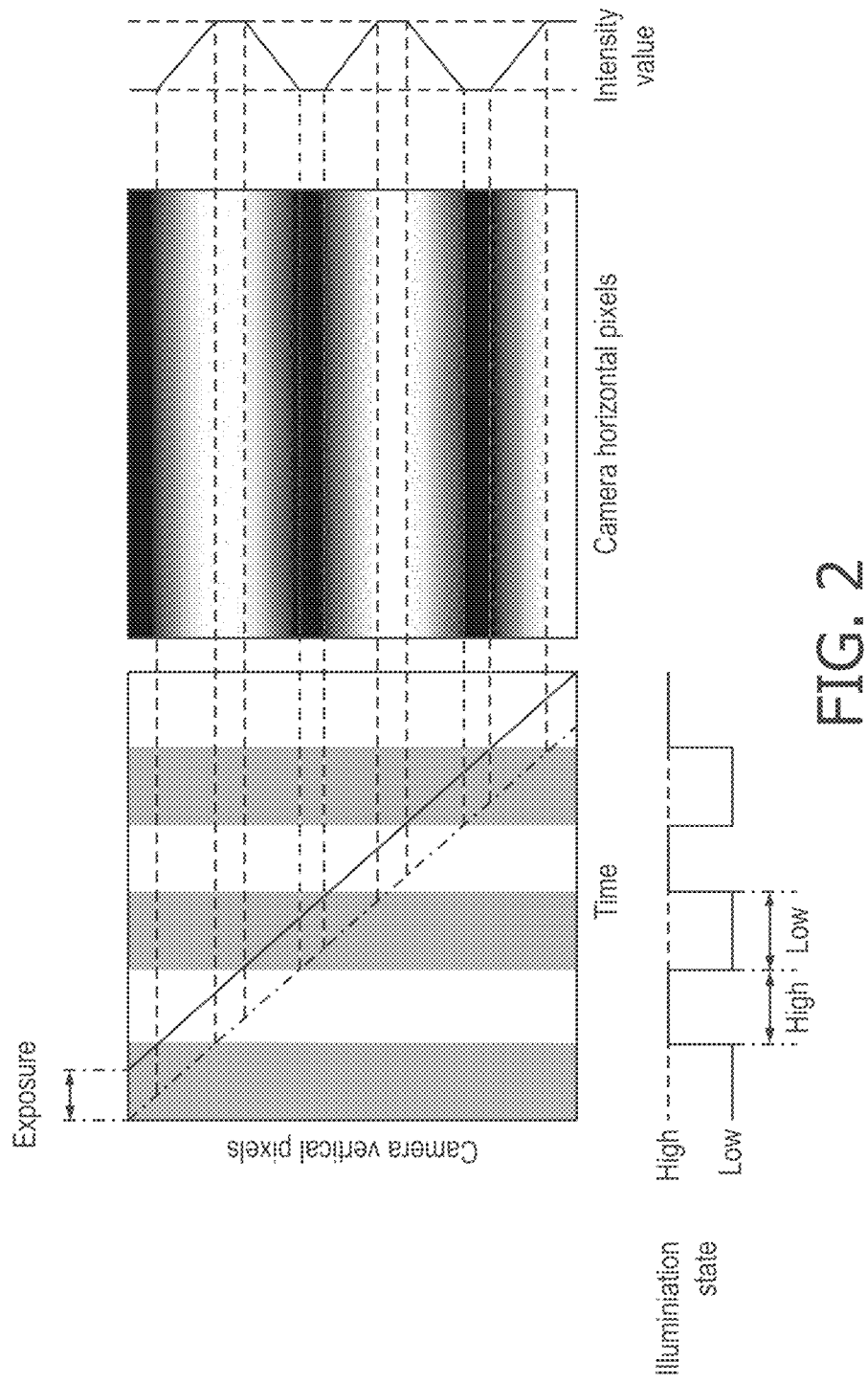
FIG. 2 illustrates the generation of bright and dark bands by pulsing light at a rolling shutter camera.

It will be appreciated that FIG. 1 only shows the components required to illustrate an aspect of the system 100 and, in a practical implementation, the system 100 may comprise alternative or additional components to those shown.

Figure 4:
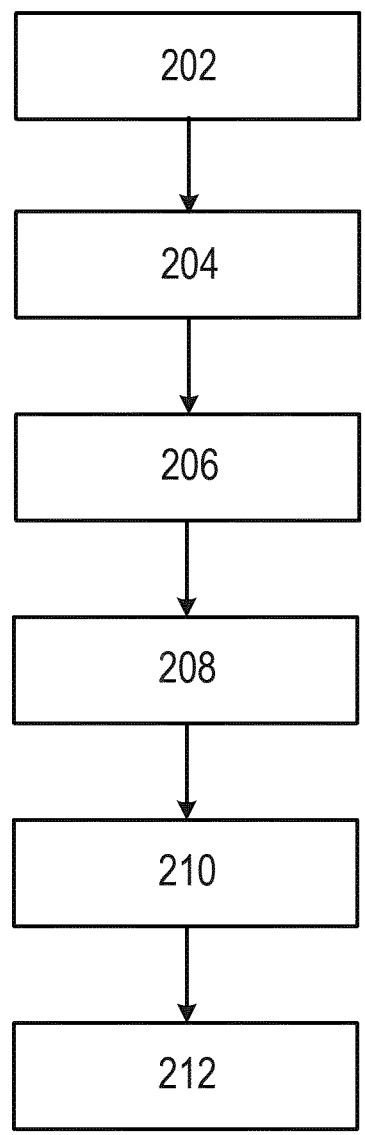
FIG. 4 illustrates a method for performing ambient light image correction according to an embodiment.

FIG. 4 illustrates a method for performing ambient light image correction according to an embodiment. The illustrated method can generally be performed by the system 100, and specifically in some embodiments by or under the control of control unit 130 of the system 100. For the purpose of illustration, at least some of the blocks of FIG. 4 will be described with reference to the various components of the system 100 of FIG. 3.

With reference to FIG. 4, at block 202, pulsed illumination is provided to an subject. Specifically, the pulsed illumination may be provided by the light source 110 of the system 100. The pulse frequency of the provided illumination at block 202 may be at least 70 Hz.

Returning to FIG. 4, at block 204, while the subject is illuminated by the pulsed illumination (as described with reference to block 202), a plurality of images of the subject are captured. It will be appreciated that, in the context of the present disclosure, since the illumination is a pulsed illumination (with high-states and low-states), it is possible that at least one or more of the plurality of captured images may be captured during a low-state, i.e. at an instance during which the subject is not (fully) illuminated.

At block 204, each of the plurality of images is captured at an exposure time shorter than the wave period of the pulsed illumination. The pulse frequency of the illumination provided at block 202 is not a multiple integral of the frame rate at which the plurality of images are captured. A total time during which the plurality of images is captured at block 204 is at least half of the wave period of the pulsed illumination. It will be appreciated that although the theoretical minimum for the total time during which the plurality of images is captured is half a wave period, in practice this may be actually, for example, ten wave periods—this is because it is typically more difficult to have a higher frame rate of the imaging unit than the light source. In some embodiments, the upper limit for the total time during which the plurality of images is captured may be determined by any expected motion of the imaging unit and/or the subject. The plurality of images may be captured by the imaging unit 120 of the system 100.

In some practical implementations, in order to obtain a sufficient number of data points that represent the distribution of pixel values so as to estimate the difference between light on and light off conditions, the plurality of images captured may be in the order of at least 8-10 frames. For example, if the frame rate of the imaging unit is 100 Hz and the number of captured images is 10, the total time during which the plurality of images is captured is 0.1 s. Also, as it is preferable to avoid flickering of light being perceived by a user, the pulse frequency may be at a very high rate, e.g. 117 Hz. With the configuration proposed in this example, the total time during which the images are captured would cover a large number of wave periods. By ensuring that the pulse frequency of the illumination is not a multiple integral of the frame rate, light pulse(s) can effectively be sampled at different phases of the pulsating light, which ensures that there is sufficient data resembling the distribution.

In some embodiments, an imaging unit which employs a rolling shutter may be used at block 204. In this case, each of the plurality of captured images at block 204 may comprise a plurality of bright bands and dark bands. A bright band corresponds to a high state of the pulsed illumination, and a dark band corresponds to a low state of the pulsed illumination.

Alternatively, in some embodiments, an imaging unit which employs a global shutter may be used at block 204. In these embodiments, the global shutter may be configured such that it is quick enough to accommodate requirements for the imaging unit 120 (e.g. with respect to frame rate and exposure time), while maintaining sufficient signal-to-noise ratio (SNR).

Returning to FIG. 4, at block 206, a predetermined number n (e.g. 10) of candidate images are obtained from the plurality of images captured at block 204. Specifically, the candidate images may be obtained by the control unit 130 of the system 100. The candidate images are n sequential images in the plurality of captured images. In some embodiments, n may be predetermined at least based on the pulse frequency of the pulse illumination and the frame rate at which the plurality of images are captured. In some embodiments, n may be further predetermined based on at least one of: lighting conditions and detected movement of the imaging unit and/or the subject.

The predetermined number n of candidate images may be a selected subset from the plurality of images captured at block 204. In some embodiments, in order to reduce motion artefacts, the predetermined number n of candidate images obtained may be minimized. Also, in some embodiments, the plurality of images captured at block 204 may be the same number as the predetermined number. In this case, the candidate images may be the same as the captured images.

As mentioned above, in some embodiments an imaging unit which employs a global shutter may be used at block 204. In these embodiments, at block 206 obtaining the candidate images may include selecting images that correspond to the same phase of the pulsed illumination. By selecting images that correspond to the same phase of the pulsed illumination, the sorting operation (as described in more detail with respect to block 208 below) can be improved.

Returning to FIG. 4, at block 208, for each of every pixel location in the plurality of candidate images, a sorted list of pixels is generated by sorting the respective pixels each corresponding to the respective pixel location in the plurality of candidate images obtained at block 206. The sorting at block 208 is based on the pixel value of the respective pixels. The generation of the sorted lists of pixels at block 208 may be performed by the control unit 130 of the system 100.

As explained above with reference to FIG. 3, in an example where the plurality of images are captured using a monochrome camera, the pixel value is the pixel value as is. As another example, in the case the plurality of images are captured using a RGB camera, the pixel value may be an intensity value obtained through the processing of the R value, the G value and the B value of the respective pixel in the candidate image, e.g. using "Lab" processing and taking the L values. The sorting of respective pixels each corresponding to the respective location in the plurality of candidate images may be based on intensity. In particular, in some embodiments, the sorting of respective pixels may be based on the average intensity of a group of pixels, so as to enhance robustness of the technique. In some embodiments, the respective pixels each corresponding to the respective pixel location in the plurality of candidate images may be sorted by ascending order.

Returning to FIG. 4, at block 210, for each of every pixel location in the plurality of candidate images, a set of weights is applied to the respective sorted list of pixels. The application of the set of weights may be performed by the control unit 130 of the system 100. The set of weights is associated with a least squares approximation of a probability density function of the pixel value over time. In some embodiments, the set of weights to be applied to the sorted lists of pixels may be selected from a table of predetermined coefficients.

Although not shown in FIG. 4, in some embodiments the method may further comprise determining the set of weights to be applied to the sorted lists of pixels based on an estimated signal-to-noise ratio of the plurality of candidate images. Furthermore, the method may further comprise determining the set of weights to be applied to the sorted lists of pixels based on at least one of: an exposure time at which the plurality of images are captured, a sensitivity level of the imaging unit, and a detected light level of the plurality of captured images. The step of determining the set of weights to be applied may be performed any time before block 210. In some of these embodiments, determining the set of weights to be applied to the sorted lists of pixels may comprise selecting, from a plurality of predetermined sets of weights, the set of weights to be applied.

Returning to FIG. 4, at block 212, an estimated ambient light corrected image is generated based on the plurality of weighted and sorted lists of pixels, by summing the plurality of weighted and sorted lists of pixels. The generation of the estimated ambient light corrected image may be performed by the control unit 130 of the system 100.

Figure 5A:
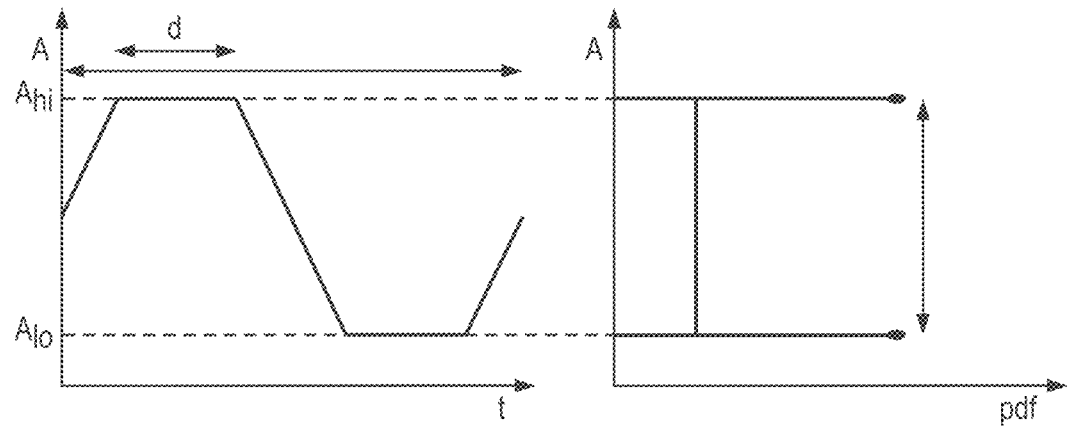
FIG. 5A is a graph illustrating pixel value as a function of time and a graph illustrating the corresponding probability density function in a theoretical noiseless case.
Figure 5B:
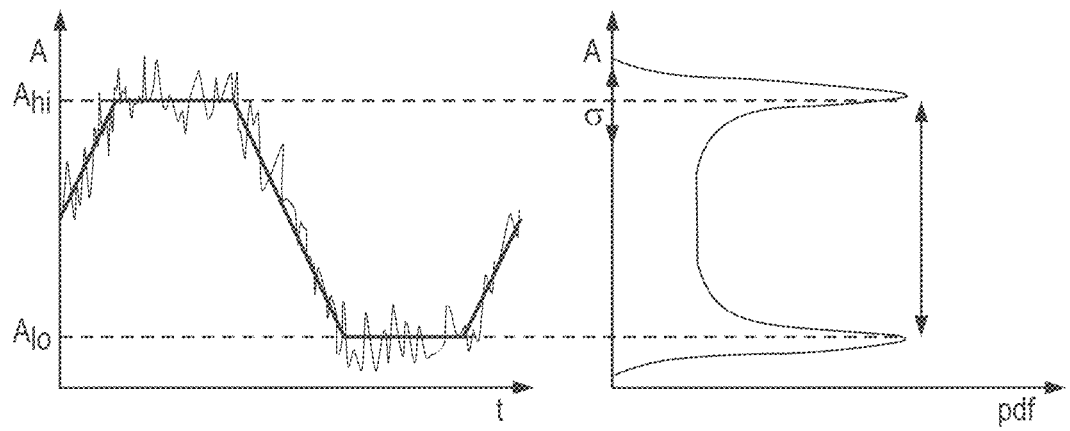
FIG. 5B is a graph illustrating pixel value as a function of time and a graph illustrating the corresponding probability density function in a practical case.

FIG. 5A is a graph illustrating pixel value as a function of time and a graph illustrating the corresponding probability density function in a theoretical noiseless case, and FIG. 5B is a graph illustrating pixel value as a function of time and a graph illustrating the corresponding probability density function in a practical case. The generation of the estimated ambient light corrected image as described with reference to FIG. 3 and FIG. 4 above is based on Maximum Likelihood Estimation (MLE) theory. Within MLE, parameters of a model are estimated given a set of observations. The prototypical example of MLE is to determine the best possible estimate for bias and standard deviation of a Gaussian process given a number of observations of that process. FIG. 5A represents an exemplary pixel value, e.g. the red pixel value at a certain image location y, x, over time (a number of frames or candidate images) under theoretical noiseless conditions, as well as the corresponding probability density function. In the context of MLE, in order to estimate an ambient light corrected image, the distance between the high and low values (i.e. $a_{hi}$-$a_{lo}$) need to be estimated based on a number of observations (i.e. samples). The parameter d as shown in FIG. 5A is the relative portion of time the pattern is high (or low) within the time period. This parameter is dependent on the flicker frequency of the modulated light provided by the imaging unit, the frame rate or read out rate at which the images are captured, the number of horizontal video lines, and the exposure time. For a given configuration or set up, these variables are fixed and therefore d remains the same.

Comparing FIG. 5A with FIG. 5B, in a practical case as represented by FIG. 5B noise is picked up especially at low light conditions. Under the assumption of Gaussian noise with standard deviation $\sigma^2$, it can be shown that the probability distribution function is given by:

$$f(x|d, a_{lo}, a_{hi}) = $$
$$d \cdot f_g(x - a_{lo}) + d \cdot f_g(x - a_{hi}) + \frac{c}{2}\left(\text{erf}\left(\frac{x - a_{lo}}{\sqrt{2\pi\sigma^2}}\right) - \text{erf}\left(\frac{x - a_{hi}}{\sqrt{2\pi\sigma^2}}\right)\right)$$

with:

$$c = \frac{1 - 2d}{a_{hi} - a_{lo}}$$

$$f_g(x) = \frac{1}{\sqrt{2\pi\sigma^2}} e^{-\frac{x^2}{2\sigma^2}}$$

and:

-continued $$\mathrm{erf}(x) = \frac{1}{\sqrt{\pi}} \int_{-x}^{x} e^{-t^2} dt$$

This probability distribution function f(x|d, $a_{lo}$, $a_{hi}$) provides the probability of finding a value x given the parameters d, $a_{lo}$ and $a_{hi}$ and is effectively the convolution of the theoretical noise-free pdf (right of FIG. 5A) with the Gaussian kernel $f_g(x)$.

In contrast to the prototypical example for MLE estimates, in practical cases it is not possible to derive an analytical equation as the MLE estimate results in a product of summed terms. However, it would be possible to pursue an improved estimation using a least squares approximation. Assuming that a sequence of observations of a certain pixel value is received over a number of candidate images. The "max-min" estimation can be regarded as sorting the sequence of observations, weighting the largest value with +1, the lowest value with −1, and weighting all observations in between with 0. Along this line the estimation of ambient light corrected image can be regarded as weighting the sequence of sorted observations differently to obtain a more accurate estimate:

$$a_{hi} - a_{lo} \approx \sum_{f=0}^{F-1} w[f] \cdot s_{sort}[f]$$

where w is a pre-calculated set of weights, and $s_{sort}$ is the sequence of sorted pixel values (from low to high).

Provided with the statistics of the sequences of observations, including an estimate of the signal-to-noise ratio (SNR) and the length of the sequence, i.e. the number of candidate images, by simulation the optimal weights for estimating $a_{hi}$-$a_{lo}$ can be pre-calculated or predetermined. In more detail, in some embodiments for different values of SNRs the coefficients to be applied as weights are different.

Figure 6:
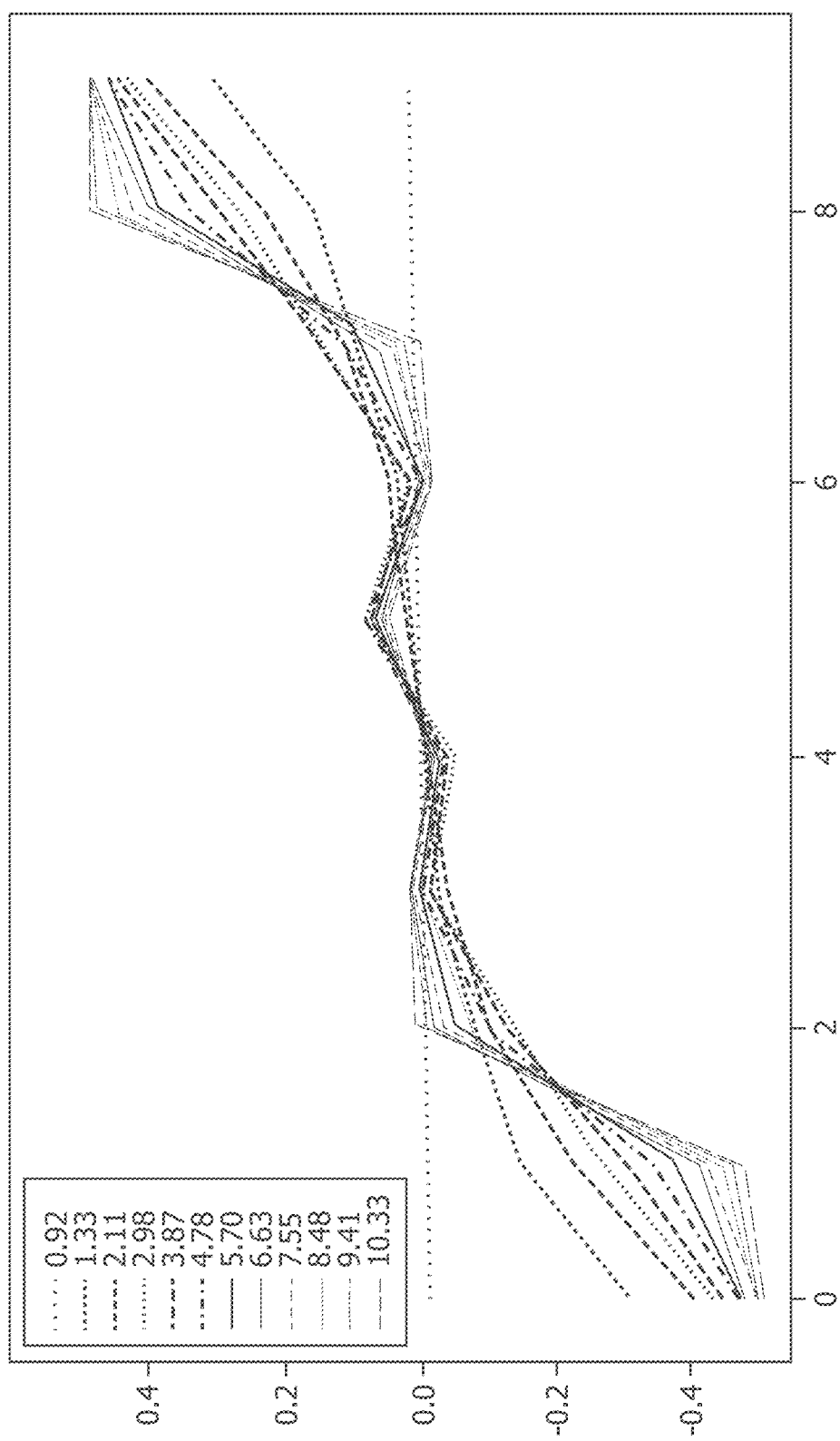
FIG. 6 is a graph illustrating standard deviations of a pixel sequence over a number of frames for a number of pre-calculated weights.

Also in some embodiments the optimal set of weights to be applied may be a function of SNR. Hence, in a typical situation a 2D table of coefficients can be pre-calculated, where based on an estimate or proxy of the current SNR a set of weights may be selected. FIG. 6 illustrates a number of pre-calculated weights for least squares estimation for a number of SNRs. The values shown in this graph are the standard deviations of a pixel sequence over a number of frames (i.e. candidate images). The estimate of the SNR can e.g. be obtained by calculating the standard deviation of the sequence of observations (i.e. the plurality of candidate images), which can be analytically described as:

$$\sigma = \sqrt{E\{(X-\mu)^2\}} = \sqrt{E\{(S+N-\mu_s)^2\}} =$$
$$\sqrt{E\{S^2 + N^2 - 2\mu_s S + \mu_s^2\}} = \sqrt{E\{S^2\} - (E\{S\})^2 + E\{N^2\}} = \sqrt{\sigma_s^2 + \sigma_n^2}$$

Where X is the signal consisting of actual signal S and noise N, μ is the mean of the signal X, and $\mu_s$ is the mean of the signal S (equal to μ) since noise is assumed not to have any bias. The equations show that measuring the standard deviation of the sequence of images has a monotonous increase with increased signal level.

Therefore, for a given or known noise level (variance) $\sigma_n^2$, the standard deviation may be a good proxy for the SNR. For comparison purposes, Table 1 below shows the differences in calculates for both the max-min estimation and the estimation technique described in the present disclosure, as represented in Pseudo code:

TABLE 1

Comparison of estimators using Pseudo code

| Max-min estimation | Estimation technique described in the present disclosure |
| --- | --- |
| for each pixel p(y, x) | for each pixel p(y, x) |
| b(f,y,x) = p(y,x) # buffer | b(f,y,x) = p(y,x) # buffer |
| $b_{max}$(y,x) = max(b(f,y,x)) # for f | b'(f,y,x) = sort(b(f,y,x)) # for f |
| $b_{min}$(y,x) = min(b(f,y,x)) # for f | # Optionally: var or std of b(f,y,x) -> index into 2D table |
| a(y,x) = $b_{max}$(y,x) − $b_{min}$(y,x) | a(y,x) = sum(w(f) * b'(f,y,x)) |

Figure 7:
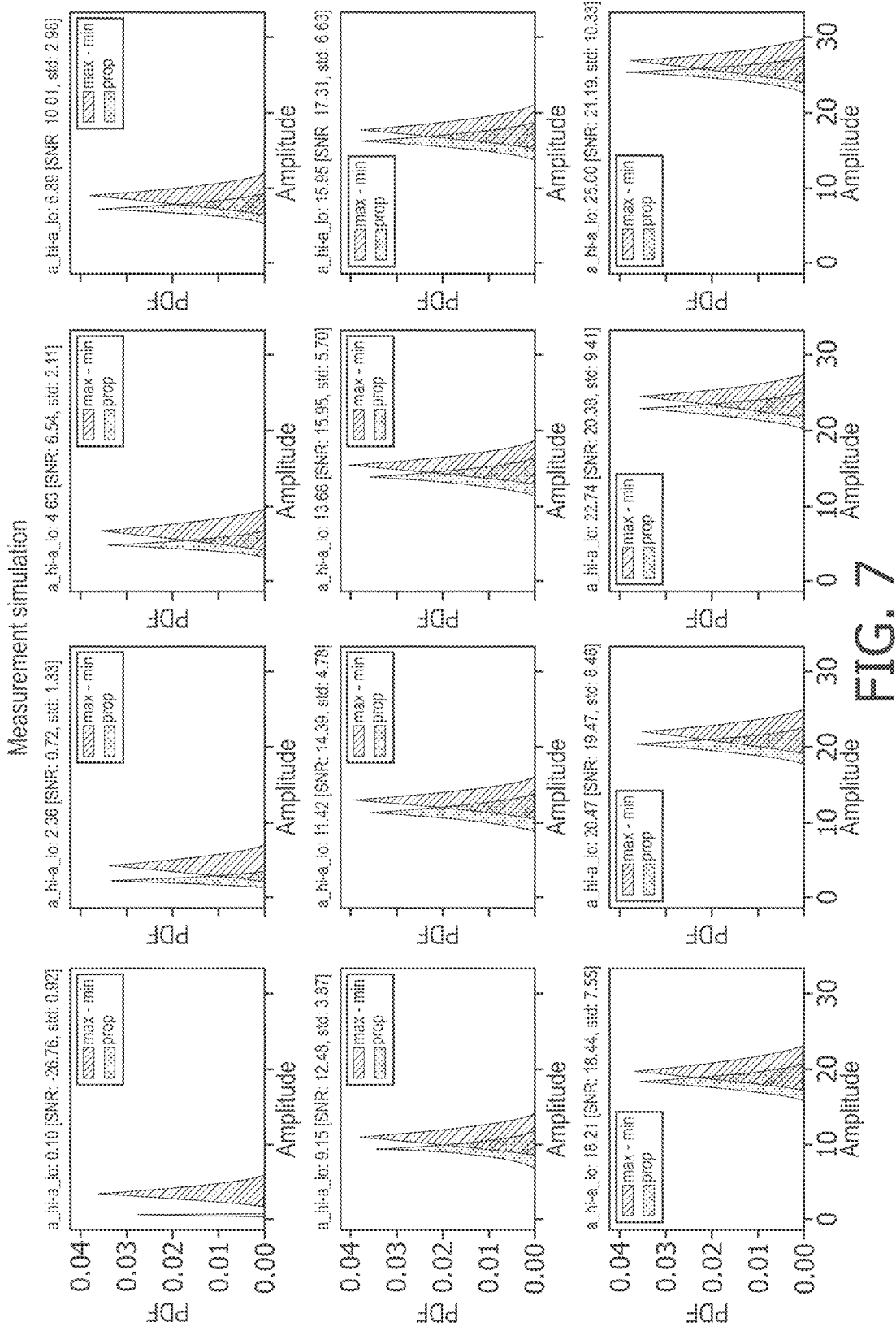
FIG. 7 is a graph showing results of a series of simulated measurements using the max-min estimation and the estimation technique according to an embodiment of the present disclosure.

Results of a series of simulated measurements using the max-min estimation and the estimation technique proposed herein are provided in FIG. 7, which show that on average the proposed estimation technique is more accurate. In more detail, FIG. 7 contains comparison of probability distribution functions of estimates for max-min estimation and least squares estimation for a number of different SNRs, where in these simulations the noise level remained constant. The $a_{hi}$-$a_{lo}$ value above each subplot in FIG. 7 indicates the correct value. By comparing the results associated with the max-min estimation and the estimation technique described herein, it is clear that the estimation technique described herein achieves less bias and smaller standard deviation. There is thus provided an improved system and method for performing ambient light image correction, which overcome the existing problems.

There is also provided a computer program product comprising a computer readable medium, the computer readable medium having computer readable code embodied therein, the computer readable code being configured such that, on execution by a suitable computer or processor, the computer or processor is caused to perform at least a part of the method or methods described herein. Thus, it will be appreciated that the disclosure also applies to computer programs, particularly computer programs on or in a carrier, adapted to put embodiments into practice. The program may be in the form of a source code, an object code, a code intermediate source and an object code such as in a partially compiled form, or in any other form suitable for use in the implementation of the method according to the embodiments described herein.

It will also be appreciated that such a program may have many different architectural designs. For example, a program code implementing the functionality of the method or system may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other.

An embodiment relating to a computer program product comprises computer-executable instructions corresponding to each processing stage of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a data storage, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A system for performing ambient light image correction, the system comprising:
   a light source configured to provide pulsed illumination to a subject;
   an imaging unit configured to capture, while the subject is illuminated by the pulsed illumination provided by the light source, a plurality of images of the subject, wherein each image of the plurality of images is captured at an exposure time shorter than a wave period of the pulsed illumination, wherein a pulse frequency of the pulsed illumination provided by the light source is not a multiple integral of a frame rate at which the plurality of images are captured by the imaging unit, and wherein a total time during which the plurality of images are captured is at least half of the wave period of the pulsed illumination; and
   a control unit configured to:
      obtain a predetermined number n of a plurality of captured images, wherein the plurality of candidate images are n sequential images of the plurality of images;
      generate, for each pixel location of every pixel location in the plurality of candidate images, a respective sorted list of pixels by sorting respective pixels each corresponding to the respective pixel location in the plurality of candidate images, wherein the sorting is based on a pixel value of the respective pixels;
      apply, for the each pixel location of every pixel location in the plurality of candidate images, a set of weights to the respective sorted list of pixels to obtain a plurality of weighted and sorted lists of pixels, wherein the set of weights is associated with a least squares approximation of a probability density function of the pixel value over time; and
      generate an estimated ambient light corrected image based on the plurality of weighted and sorted lists of pixels by summing the plurality of weighted and sorted lists of pixels.

2. The system according to claim 1, wherein the predetermined number n is predetermined at least based on the pulse frequency of the pulse illumination and the frame rate at which the plurality of images are captured.

3. The system according to claim 1, wherein the respective pixels each corresponding to the respective pixel location in the plurality of candidate images are sorted by ascending order.

4. The system according to claim 1, wherein the control unit is further configured to determine the set of weights to be applied to the sorted lists of pixels based on a signal-to-noise ratio of the plurality of candidate images.

5. The system according to claim 1, wherein the control unit is further configured to determine the set of weights to be applied to the sorted lists of pixels based on an exposure time at which the plurality of images are captured, a sensitivity level of the imaging unit, and/or a detected light level of the plurality of images.

6. The system according to claim 4, wherein determining the set of weights to be applied to the sorted lists of pixels comprises selecting, from a plurality of predetermined sets of weights, the set of weights to be applied.

7. The system according to claim 1, wherein the set of weights to be applied to the sorted lists of pixels is selected from a table of predetermined coefficients.

8. The system according to claim 1, wherein the imaging unit is configured to employ a rolling shutter such that each image of the plurality of images comprises a plurality of bright bands and dark bands, wherein a bright band corresponds to a high state of the pulsed illumination and a dark band corresponds to a low state of the pulsed illumination.

9. A method for performing ambient light image correction, the method comprising:
   providing pulsed illumination to a subject;
   capturing, while the subject is illuminated by the pulsed illumination, a plurality of images of the of the subject, wherein each image of the plurality of images is captured at an exposure time shorter than a wave period of the pulsed illumination, wherein a pulse frequency of the pulsed illumination is not a multiple integral of a frame rate at which the plurality of images are captured, and wherein a total time during which the plurality of images are captured is at least half of the wave period of the pulsed illumination;
   obtaining a predetermined number n of a plurality of candidate images, wherein the plurality of candidate images are n sequential images of the plurality of images;
   generating, for each pixel location of every pixel location in the plurality of candidate images, a respective sorted list of pixels by sorting the respective pixels each corresponding to the respective pixel location in the plurality of candidate images, wherein the sorting is based on a pixel value of the respective pixels;
   applying, for the each pixel location of every pixel location in the plurality of candidate images, a set of weights to the respective sorted list of pixels to obtain a plurality of weighted and sorted lists of pixels, wherein the set of weights is associated with a least squares approximation of a probability density function of the pixel value over time; and generating an estimated ambient light corrected image based on the plurality of weighted and sorted lists of pixels by summing the plurality of weighted and sorted lists of pixels.

10. The method according to claim 9, wherein the predetermined number n is predetermined at least based on the pulse frequency of the pulse illumination and the frame rate at which the plurality of images are captured.

11. The method according to claim 9, wherein sorting the respective pixels each corresponding to the respective pixel location in the plurality of candidate images is by ascending order.

12. The method according to claim 9, further comprising determining the set of weights to be applied to the sorted lists of pixels based on a signal-to-noise ratio of the plurality of candidate images.

13. The method according to claim 9, further comprising determining the set of weights to be applied to the sorted lists of pixels based on an exposure time at which the plurality of images are captured, a sensitivity level of an imaging unit capturing the plurality of images, and/or a detected light level of the plurality of images.

14. The method according to claim 12, wherein determining the set of weights to be applied to the sorted lists of pixels comprises selecting, from a plurality of predetermined sets of weights, the set of weights to be applied.

15. A non-transitory computer readable medium for performing ambient light image correction, the non-transitory computer readable medium storing computer executable instructions that, on execution by a computer or processor, cause the computer or processor to;

receive a plurality of images captured of a subject illuminated by a pulsed illumination, wherein each image of the plurality of images is captured at an exposure time shorter that a wave period of the pulsed illumination, wherein a pulse frequency of the pulsed illumination is not a multiple integral of a frame rate at which the plurality of images are captured, and wherein a total time during which the plurality of images are captured is at least half of the wave period of the pulsed illumination;

obtain a plurality of candidate images, wherein the plurality of candidate images are a predetermined number sequential images of the plurality of images;

generate, for each pixel location of every pixel location in the plurality of candidate images, a respective sorted list of pixels by sorting the respective pixels each corresponding to the respective pixel location in the plurality of candidate images, wherein the sorting is based on a pixel value of the respective pixels;

apply, for the each pixel location of every pixel location in the plurality of candidate images, a set of weights to the respective sorted list of pixels to obtain a plurality of weighted and sorted lists of pixels, wherein the set of weights is associated with a least squares approximation of a probability density function of the pixel value over time; and generate an estimated ambient light corrected image based by summing the plurality of weighted and sorted lists of pixels.

16. The non-transitory computer readable medium according to claim 15, wherein the predetermined number is predetermined based on at least the pulse frequency of the pulse illumination and the frame rate at which the plurality of images are captured.

17. The non-transitory computer readable medium according to claim 15, wherein the respective pixels each corresponding to the respective pixel location in the plurality of candidate images are sorted by ascending order.

18. The non-transitory computer readable medium according to claim 15, wherein the computer executable instructions further cause the computer or processor control unit to determine the set of weights to be applied to the sorted lists of pixels based on a signal-to-noise ratio of the plurality of candidate images, an exposure time at which the plurality of images are captured, a sensitivity level of an imaging unit capturing the plurality of images, and/or a detected light level of the plurality of images.

19. The non-transitory computer readable medium according: to claim 15, wherein the set of weights to be applied to the sorted lists of pixels is selected from a table of predetermined coefficients.

20. The non-transitory computer readable medium according to claim 15, wherein each image of the plurality of images comprises a plurality of bright bands and dark bands, wherein a bright band corresponds to a high state of the pulsed illumination and a dark band corresponds to a low state of the pulsed illumination.

* * * * *